Feb. 24, 1959 F. X. LAMB 2,875,410
ELECTRICAL INSTRUMENT
Filed Aug. 19, 1954 2 Sheets-Sheet 1
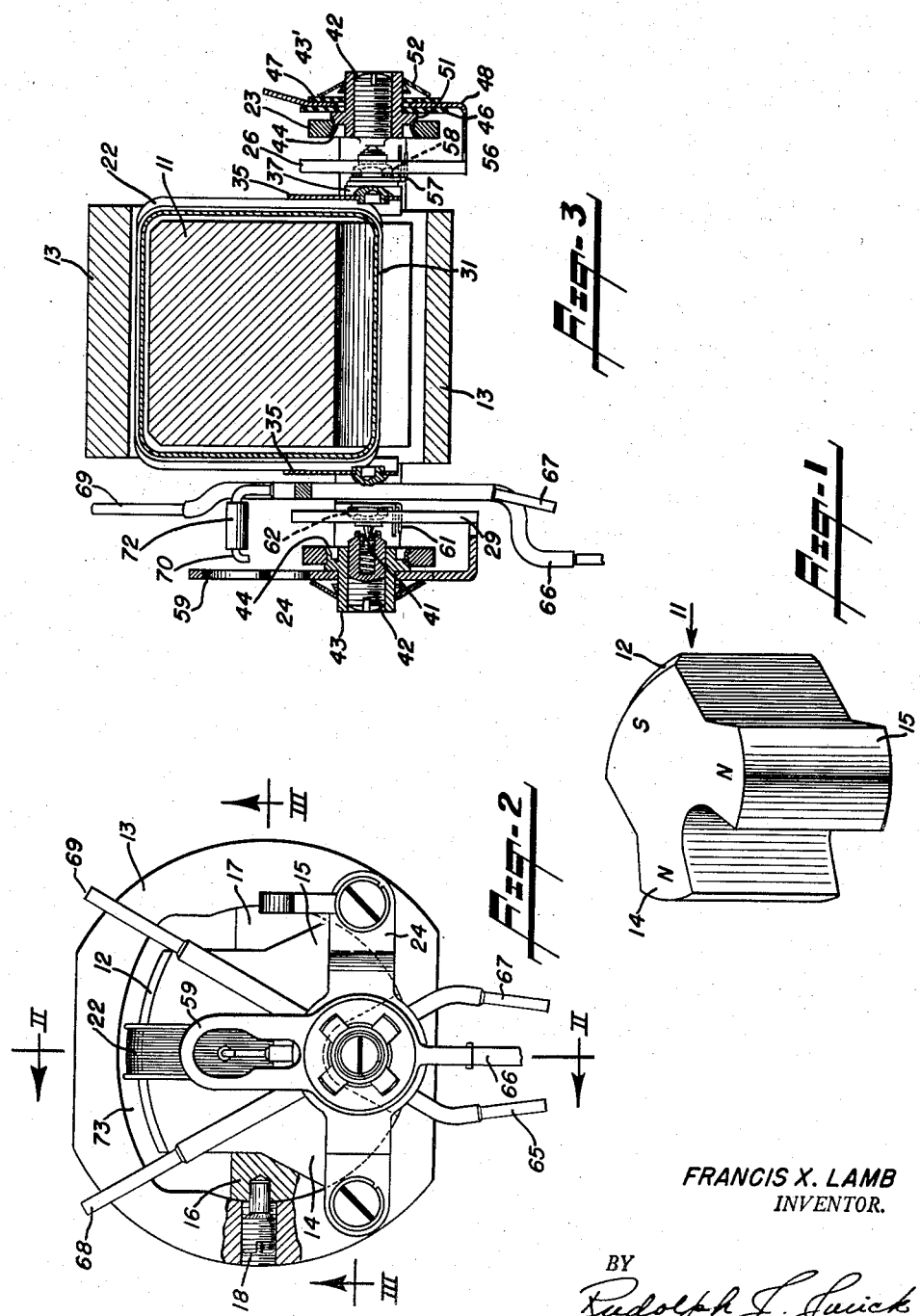
FRANCIS X. LAMB
INVENTOR.
BY Rudolph J. Juick
ATTORNEY Feb. 24, 1959

F. X. LAMB 2,875,410

ELECTRICAL INSTRUMENT

Filed Aug. 19, 1954

FRANCIS X. LAMB
INVENTOR.

BY
Rudolph J. Jurick
ATTORNEY

United States Patent Office 2,875,410
Patented Feb. 24, 1959

2,875,410

ELECTRICAL INSTRUMENT

Francis X. Lamb, East Orange, N. J., assignor, by mesne assignments, to Daystrom, Incorporated, Murray Hill, N. J., a corporation of New Jersey Application August 19, 1954, Serial No. 450,954

8 Claims. (Cl. 324—150)

This invention relates to electrical instruments and more particularly to the construction of such instruments incorporating an internal magnet of novel form resulting in an instrument mechanism of high sensitivity and small overall size and providing certain manufacturing and assembly economies.

Instruments of the class contemplated by this invention comprise a permanent magnet spaced from a soft-iron yoke to form a magnetic flux gap. A wire wound movable coil is pivotally mounted for rotation in the flux gap in response to current conducted to the coil through spiral hair springs. Usually a pointer is secured to the movable coil and moves over a scale calibrated in values which are related to the magnitude of the current flowing through the movable coil. In certain applications as, for example, aircraft navigational heading indicators, the angular deflection of the pointer may be relatively small but the instrument should have a high sensitivity, high torque, good damping characteristics, small overall size and light weight. To meet these requirements it is accepted practice to provide an instrument mechanism wherein the entire magnetic energy of the permanent magnet is concentrated in a single flux gap having an arcuate length slightly longer than the angular deflection range of the pointer. The movable coil is so mounted that only one side of the wire turns operates within the flux gap. Such instruments are known as single air gap, permanent magnet movable coil instruments. A single air gap instrument made in accordance with this invention offers the advantages of simplicity of construction and a magnetic flux density substantially greater than instruments of this type heretofore available.

An object of the invention is to provide a single air gap electrical instrument having simplicity of design and a high flux density, that is, about 60% above that obtained with conventional concentric core magnet design, by employing a magnet shaped generally like the letter Y.

Another object of my invention is to provide an electrical instrument particularly suitable for use in aircraft navigational heading indicators where high flux density, good damping, and high torque with a short scale angle are among the important requirements.

A further object of my invention is to provide an electrical indicating instrument in which the weight of the wire wound moving coil counterbalances the weight of the pointer, with or without additional balance weights.

An additional object of my invention is to provide an electrical indicating instrument having a permanent magnet, generally Y-shaped, in which the two arms of the magnet contact the inner wall of a surrounding soft-iron yoke, while the base of the Y is spaced from the opposite wall of the yoke to form a flux gap.

An object of this invention is the provision of a permanent magnet having the form of a Y and in which the base of the Y constitutes one polar surface and the ends of the diverging arms constitute opposite polar surfaces.

These and other objects and advantages of the invention will become apparent from the following specification, when taken with the accompanying drawings. In the drawings wherein like references denote like parts in the several views:

Figure 1 is a perspective view of a permanent magnet made in accordance with this invention;

Figure 2 is a front elevational view, drawn to an enlarged scale, of the inner mechanism of an instrument embodying my invention, with parts broken away and the scale plate omitted to more clearly show the parts therebeyond;

Figure 3 is an axial sectional view on the line II—II of Figure 2, in the direction of the arrows;

Figure 4:
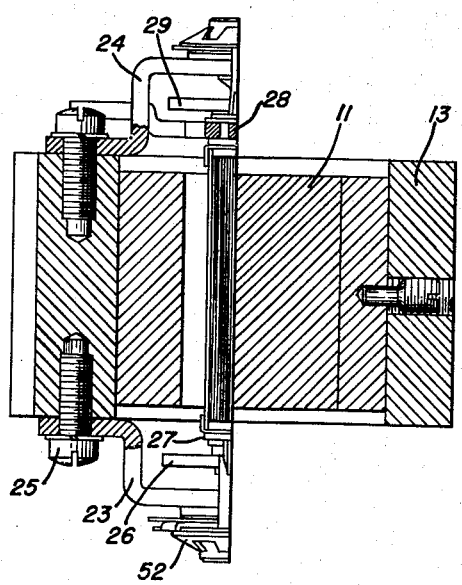
Figure 4 is a transverse sectional view on the line III—III of Figure 2, in the direction of the arrows.

Figure 1 illustrates a permanent magnet 11 made in accordance with this invention. The magnet, in plan, is shaped like the conventional form of the letter Y, that is, with a base or "upright" portion from one end of which a pair of arms diverge, and is magnetized in such manner that the base or "upright" portion 12 thereof has a magnetic polarity opposite to that of the stems or arms 14, 15, the flux passing along the stem and dividing at the arms. The opening between the magnet arms serves to accommodate one side of a wire wound movable coil in the assembled instrument mechanism.

Reference is now made to Figures 2–5, inclusive, showing an instrument mechanism incorporating the Y-shaped magnet. The stem or base of the Y is shown uppermost and indicated at 12, that is, the Y is here shown inverted. The magnet 11 is shown surrounded or encircled by a soft iron yoke 13 which acts as a flux collector therefor. The arms of the Y, 14 and 15, have their outer surfaces shaped to conform with the engaged inner surfaces of the yoke 13 and are pressed firmly into magnetic connection therewith. This is here effected by providing blocks 16 and 17, of non-magnetic metal such as brass, which are pressed firmly into engagement with the sides of the magnet 11 by set screws 18 passing through threaded, radial holes formed in the yoke. It will be seen that the blocks have angular surfaces fitting the sides of the permanent magnet where the arms diverge from the stem thereof, so that not only is the magnet tightly squeezed between the opposite portions of the yoke 13, but the wedge-shaped blocks 16 and 17 force the arms 14 and 15 so that, in this instance, their curved end surfaces are pressed tightly into engagement with the correspondingly-curved inner surfaces of said yoke, leaving the stem of the Y magnet spaced from the yoke 13 to form a coil-traversed air gap 73.

Figure 5:
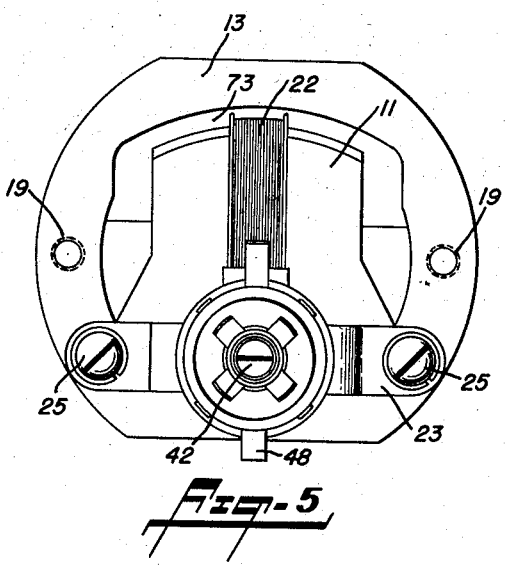
Figure 5 is a rear elevational view of the mechanism shown in Figure 2.

The yoke 13 is provided with a plurality of threaded mounting holes 19, see particularly Figure 5, for receiving bolts, or the like (not shown), for holding said yoke in place on a base (not shown) that forms part of an instrument housing as is well known in this art.

The movable coil 22 is supported by a pair of aligned pivots, the axis of which passes between the arms of the magnet 11, and which pivots operate in bearings carried by a back or lower bridge 23, and a front or upper bridge 24. The lower bridge 23 is secured to the yoke 13 by means of tap bolts 25 and arches down or away from the yoke, as shown most clearly in Figure 4, to provide room for the reception of the lower or inner spiral mounting spring 26. This spring surrounds the lower pivot assembly 27 of the moving coil 22, which corresponds generally with the upper or outer pivot assembly 28, in turn surrounded by the upper or outer mounting spring 29.

The construction of the pivot assemblies of the moving coil 22 is different from prior structures in that, instead of being at opposite ends of a single pivot shaft, they form two separate pivots connected only by the inner or axial section 31 of the coil 22. Specifically, the coil 22 may be formed on an aluminum frame shaped to provide an outer trough in which strands of enameled wire forming the coil are received.

Figure 7:
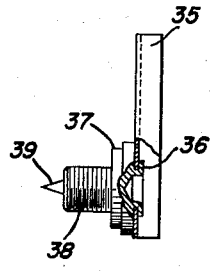
Figure 7 is an enlarged view showing the assembly of one of the pivot bases.

The construction of the pivot assemblies is shown in the enlarged view of Figure 7. Each pivot assembly includes a plate 35 generally channel shaped in transverse section. These plates are adapted for embracing the aluminum frame of the movable coil (see Figure 3) and to be secured thereto by cement. In this instance, the lower pivot plate is electrically insulated from the frame by inserting a suitable sheet of insulating material between such plate and the frame. The upper pivot plate can be grounded directly to the coil frame, it being here pointed out that one end of the movable coil wire is soldered to the upper plate 35 while the other wire end is soldered to the lower such plate.. Reverting again specifically to Figure 7, each pivot plate 35 is provided with an aperture for receiving the inwardly-directed collar 36, of the metal bushings 37, which collars are spun over to secure same to the plate. Each bushing 37 includes an externally threaded shank 38 provided with an axial bore to receive the pivot 39.

As shown in Figure 3, the pivots operate within spring-backed jewels 41 carried by the jewel screws 42 that are threaded into the bushings 43, 43' secured firmly to the respective upper and lower bridges 24 and 23, as by annular portions 44 expanded into engagement with the countersunk portion of the bridge hole.

Inasmuch as it is the spiral springs 26 and 29 which carry the electric current to the movable coil, it is necessary to insulate the current connection to one of the mounting springs from the connection to the other mounting spring. For that purpose the lower or inner bushing 43' has insulating washers, 46 and 47, on opposite sides of the bottom spring abutment 48. Such abutment has a hole diameter significantly larger than the outside diameter of the lower bushing 43' and, consequently, the abutment is insulated from the bushing. The insulating washers and abutment are resiliently pressed against the shoulder 51 of the lower bushing 43' by means of a locking washer 52 pushed over the stem portion of the bushing 43'. The outer end of the spiral spring 26 is soldered to the inwardly directed end 56 of the abutment 48, while the inner spring end is similarly connected to an angular lug 57 held in engagement with the bottom pivot member 37 by means of a nut 58.

The structure at the outer or upper pivot assembly 28 is similar to that at the lower pivot assembly 27, except that there are no insulating washers because the spiral mounting spring 29 is grounded. The outer end of the spring 29 is connected to the zero adjuster lever 59, while its inner end is secured to an angular lug 61, in turn held on the pivot assembly 28 by means of a nut 62.

The upper pivot assembly carries the pointer system which is secured to the pivot assembly by means of the nut 62 pressing against the pointer hub through the lug 61. In the present instance, the pointer system is shown as comprising a relatively long pointer proper which, because of its length, comprises three outwardly converging elements 65, 66 and 67, forming a truss construction, the outer end of such construction not being shown in the drawings. As is well known in this art, such pointer moves over a suitable scale secured in proper operative relation thereto by known means. In the case of very long and heavy pointers which cannot be balanced by the moving coil 22, the pointer system also includes rearwardly extending arms 68, 69 and 70, the latter being bent upwardly and carrying the balance weight 72.

From the foregoing description it will be seen that I have provided, not only a novel magnet structure, but also a novel coil and pivot arrangement in which the intermediate pivot stem is formed by an inner section of the coil frame itself, the opposite coil frame section swinging in the air gap formed between the stem portion of the Y-shaped magnet and the co-axially curved surface forming an inner wall of the yoke.

Although in the present instance the air gap 73 is uniform, in radial dimension, thereby providing for uniform flux density therein and a uniform instrument deflection characteristic those skilled in this art will understand that the air gap may be made non-uniform to obtain desired scale characteristics.

Figure 6:
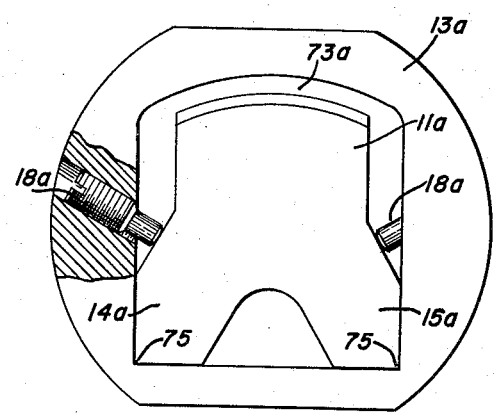
Figure 6 is a view corresponding to Figure 1 but omitting certain parts and showing a modified magnet and yoke construction.

Referring now to Figure 6, it will be seen that, although otherwise identical with the structure previously described, the yoke 13$^a$ is in this instance broached out to form corners 75 in which fit the correspondingly-shaped ends of the Y-shaped permanent magnet 11$^a$, leaving the stem or base of the Y spaced from the inner surfaces of the yoke to provide an air gap 73$^a$. In this instance, the need for non-magnetic blocks, such as those designated 16 and 17 in the preceding embodiment, is eliminated and the arms 14$^a$ and 15$^a$ of the magnet 11$^a$ are pressed directly into the corners 75 by set screws 18$^a$ threaded to the yoke 13$^a$. Instead of these screws 18$^a$ being axially aligned, they are directed generally normal to adjacent surfaces of the arms of the Y-shaped magnet and, therefore, angularly disposed with respect to one another.

It will be apparent that a maximum mass of magnet material is possible in an instrument mechanism incorporating the Y-shaped magnet and wherein the axis of rotation of the movable coil passes between the arms of the Y. Consequently, my instrument mechanism has a sensitivity 60% greater than that obtained in similar instruments of comparable size. Alternatively, my mechanism makes it possible to produce instruments of smaller size than those having equal sensitivity and made in accordance with prior practice. Further, the simple means for securing the magnet within the bore of the yoke results in reduced manufacturing and assembly costs.

As a specific summary, it will be seen that in the embodiments illustrated, the Y-magnets 11 and 11$^a$ are considerably longer, that is, the Y's are considerably taller than the width of their bases or stem portions, with their arms flaring to an exterior width approximately equal to their overall length or height. The arms of each Y-magnet start to diverge from one another at a point more than halfway or approximately two thirds of the distance from the extreme end of its base or stem to the ends of said arms, whereby the axis of pivoting of the movable coil, which is located between said arms, is offset from the center of the surrounding yoke, 13 or 13$^a$, a distance approximating or nearly equal to half of the radius of the outer contour of the cylindrical portion of the yoke.

A consideration of the yoke, 13 or 13$^a$, will show that although most of its peripheral surface is cylindrical, segments are cut away adjacent the ends of the magnet arms and opposite thereto, giving it roughly oval appearance as viewed in Figures 2, 5 and 6. By virtue of the novel construction, the movable coil 22 will sweep about a relatively large radius approximately equivalent to the interior width of the yoke or distance between the segmented sides thereof less the pivot clearance and part of the air gap, rather than as is customary between its center and sides. In other words, the radius of swing is about double that of conventional constructions and the flux gap is traversed by one side only of the coil at the side of the yoke diametrically opposite to that adjacent which the coil is pivoted. The other side of the coil is thus near the opposite side of said yoke at the approximate axis of pivoting.

Having now described my invention in detail in accordance with the requirements of the patent statutes various changes and modifications will suggest themselves to those skilled in this art, and it is intended that such changes and modifications shall fall within the scope and spirit of the invention as recited in the following claims.

I claim:

1. In an electrical instrument, in combination, a permanent magnet having a base and arms making it Y-shaped in outline, the arms of said magnet starting to diverge from one another at a point more than halfway from the extreme end of the base to the ends of said arms, the ends of said arms having a polarity opposite to that of the base, an annular yoke of material of high permeability enclosing said magnet, and means securing said magnet rigidly in place with its arms magnetically contacting the inner surface of one side of said yoke and its base spaced to form an air gap along a diametrically opposite side of said yoke.

2. The magnet as recited in claim 1 wherein the end surfaces of the arms are arcuate and of a common radius.

3. The magnet as recited in claim 2 wherein the base of the Y terminates in an arcuate end having a radius larger than that of the said arms.

4. The magnet as recited in claim 1 wherein the end surface of the base is arcuate and the end surface of each arm is tapered.

5. An instrument mechanism comprising a permanent magnet having a base and arms making it Y-shaped in outline, the arms of said magnet starting to diverge from one another at a point more than halfway from the extreme end of the base to the ends of said arms, the ends of said arms having a polarity opposite to that of the base, an annular yoke of material of high permeability enclosing said magnet, means securing said magnet rigidly in place with its arms magnetically contacting the inner surface of one side of said yoke and its base spaced to form an air gap along a diametrically opposite side of said yoke, a movable coil, and means pivotally supporting said coil adjacent one side portion for swinging movement about an aixs disposed adjacent a side of said yoke and between the arms of said magnet with the other coil side portion movable circumferentially along said air gap.

6. The invention as defined in claim 5 wherein the securing means for the magnet comprises a set screw on each side thereof threaded into holes in the yoke and pressing against outer surfaces of the opposite diverging arms of said magnet in directions substantially normal thereto.

7. The invention as defined in claim 6 in which non-magnetic metal blocks are secured on opposite sides of said magnet and between it and the inner surface of said yoke, and set screws threaded into said yoke engage said blocks to push them into firm contact with said magnet.

8. An instrument mechanism comprising a permanent magnet Y-shaped in outline, the ends of the arms of said magnet having a polarity opposite to that of the base thereof, an annular yoke of material of high permeability enclosing said magnet, said yoke being broached out to provide opposed corners receiving correspondingly shaped end portion of the magnet arms, angularly disposed set screws threaded into said yoke and into engagement with said magnet arms to push them into said corners to secure said magnet rigidly in place with its base spaced from the yoke to form an air gap, a movable coil, and means pivotally supporting said coil adjacent one side portion for swinging movement about an axis disposed between the arms of said magnet, with the other coil side portion movable circumferentially along said air gap.

References Cited in the file of this patent

UNITED STATES PATENTS

| | | |
|---|---|---|
| 678,706 | Weston | July 16, 1901 |
| 1,166,410 | Cornman | Dec. 28, 1915 |
| 2,422,714 | Bigelow | June 24, 1947 |
| 2,537,221 | Hickok | Jan. 9, 1951 |
| 2,607,812 | Lederer | Aug. 19, 1952 |
| 2,673,959 | Lovegrove | Mar. 30, 1954 |

FOREIGN PATENTS

| | | |
|---|---|---|
| 787,424 | France | Sept. 23, 1935 |
| 664,795 | Germany | Sept. 9, 1938 |